US 11,821,516 B2

(12) United States Patent
Johnson (10) Patent No.: US 11,821,516 B2
(45) Date of Patent: Nov. 21, 2023

(54) APPARATUS FOR DRIVE BELT TENSIONING

(71) Applicant: Omron Corporation, Kyoto (JP)

(72) Inventor: Craig A. Johnson, Livermore, CA (US)

(73) Assignee: OMRON CORPORATION, Kyoto (JP)

( * ) Notice: Subject to any disclaimer, the term of this patent is extended or adjusted under 35 U.S.C. 154(b) by 182 days.

(21) Appl. No.: 17/519,666

(22) Filed: Nov. 5, 2021

(65) Prior Publication Data
US 2022/0145967 A1    May 12, 2022

Related U.S. Application Data

(60) Provisional application No. 63/112,471, filed on Nov. 11, 2020.

(51) Int. Cl.
| | | |
|---|---|---|
| F16H 7/12 | (2006.01) | |
| B25J 9/10 | (2006.01) | |
| F16H 7/08 | (2006.01) | |

(52) U.S. Cl.
CPC .......... *F16H 7/1263* (2013.01); *B25J 9/1045* (2013.01); *F16H 2007/0842* (2013.01); *F16H 2007/0865* (2013.01); *F16H 2007/0891* (2013.01); *F16H 2007/0895* (2013.01)

(58) Field of Classification Search
CPC ............ F16H 7/1263; F16H 2007/0842; B25J 9/1045
See application file for complete search history.

(56) References Cited

U.S. PATENT DOCUMENTS

| 2,498,392 | A | 2/1950 | Boyle | |
|---|---|---|---|---|
| 4,969,859 | A | 11/1990 | Holbrook | |
| 9,476,244 | B2 * | 10/2016 | Miller | E06B 3/4636 |
| 2001/0046915 | A1 | 11/2001 | Green et al. | |
| 2004/0087401 | A1 * | 5/2004 | Serkh | F16H 7/1218 474/134 |
| 2006/0217223 | A1 * | 9/2006 | Schmid | F16H 7/1281 474/136 |
| 2008/0102999 | A1 | 5/2008 | Yang | |
| 2009/0062046 | A1 | 3/2009 | Lindemann | |
| 2014/0057747 | A1 * | 2/2014 | Hood | F16H 7/1263 474/113 |

FOREIGN PATENT DOCUMENTS

DE            7412059 U        7/1974

* cited by examiner

*Primary Examiner* — Jake Cook
(74) *Attorney, Agent, or Firm* — Murphy, Bilak & Homiller, PLLC (57) ABSTRACT

A mounting apparatus incorporates a dedicated physical feature configured for attachment of a tensioning tool, for tensioning of a drive belt having one of its belt pulleys carried by the mounting apparatus. In an example embodiment, the mounting apparatus comprises a body member, e.g., a mounting plate, for a pulley assembly. The body member incorporates a dedicated physical feature that is configured for engagement with a tensioning tool, for pulling the body member in a tensioning direction relative to the involved belt. The mounting apparatus comprises, for an example, an interior component of a robot, and is mounted within an interior volume of a segment of the robot, for tensioning of a drive belt carried within the interior volume.

8 Claims, 8 Drawing Sheets

APPARATUS FOR DRIVE BELT TENSIONING

TECHNICAL FIELD

A mounting apparatus incorporates a dedicated physical feature that is configured for temporary engagement by a separate tensioning tool, for tensioning of a drive belt having one of its belt pulleys carried by the mounting apparatus.

BACKGROUND

Belt drives have countless uses, but example cases involve articulated robots, where belts provide for the transfer of drive forces across jointed segments of the robots. Notable challenges in the context of jointed robots include the criticality of proper belt tensioning and the oftentimes limited access to the joint internals for tensioning adjustments.

SUMMARY

A mounting apparatus incorporates a dedicated physical feature configured for attachment of a tensioning tool, for tensioning of a drive belt having one of its belt pulleys carried by the mounting apparatus.

In an example embodiment, the apparatus comprises a mounting plate for a pulley assembly, where the mounting plate incorporates a dedicated hook feature that is configured for engagement with a tensioning tool, for pulling the mounting plate in a tensioning direction relative to the involved belt.

The dedicated hook feature on one or more embodiments is integral to the mounting plate and is machined or otherwise formed as an opening in a perimeter edge of the mounting plate. Advantageous example elements of the perimeter opening include an inlet taper for guiding an end—an engaging portion—of the tensioning tool into a hooked recess formed within the perimeter opening. For example, the inlet taper and hooked recess are formed as a continuous edge surface machined or otherwise formed within the edge defining one side of the mounting plate. The continuous edge surface includes radiused contours throughout, in at least one embodiment, to facilitate entry and exit of the tensioning tool into and out of the hooked recess. Further, in one or more other embodiments, the hook feature is mounted to the mounting plate, rather than being integrally formed within the mounting plate.

The mounting plate in at least one embodiment includes one or more attachment slots that allow back and forth movement of the mounting plate along a tensioning axis associated with the involved belt. For example, attachment hardware inserted through the attachment slots is loosened to allow sliding movement of the mounting plate for tensioning, with tensioning adjustments then achieved by booking the tensioning tool within the dedicated hook feature of the mounting plate and pulling the mounting plate in the tensioning direction. Once the tensioning tool displays or detects the correct tension on the belt, tightening of the attachment hardware in the attachment slots maintains that tension.

In at least one embodiment, the hook feature is offset relative to a center line of the mounting plate, where the centerline of the mounting plate is perpendicular to and intersects the rotational axis of the pulley carried by the mounting plate. Correspondingly, at least one of the one or more attachment slots in the mounting plate has a slot width that is dimensioned for close clearance of the attachment hardware—e.g., bolt, pin, etc.—that passes through the attachment slot, to resist angular rotation of the mounting plate around the rotational axis.

The mounting plate is a motor mounting plate in one or more embodiments, where the pulley in question is driven by the motor. In other embodiments, the mounting plate carries a spindle-mounted pulley that is at the non-driven "end" of the belt. In either case, in at least one embodiment, the mounting plate is carried within an articulated robot and carries one of the pulleys associated with a belt used to transfer motive force across or at an articulated joint of the robot.

Of course, the present invention is not limited to the above features and advantages. Those of ordinary skill in the art will recognize additional features and advantages upon reading the following detailed description, and upon viewing the accompanying drawings.

DETAILED DESCRIPTION

Figure 1:
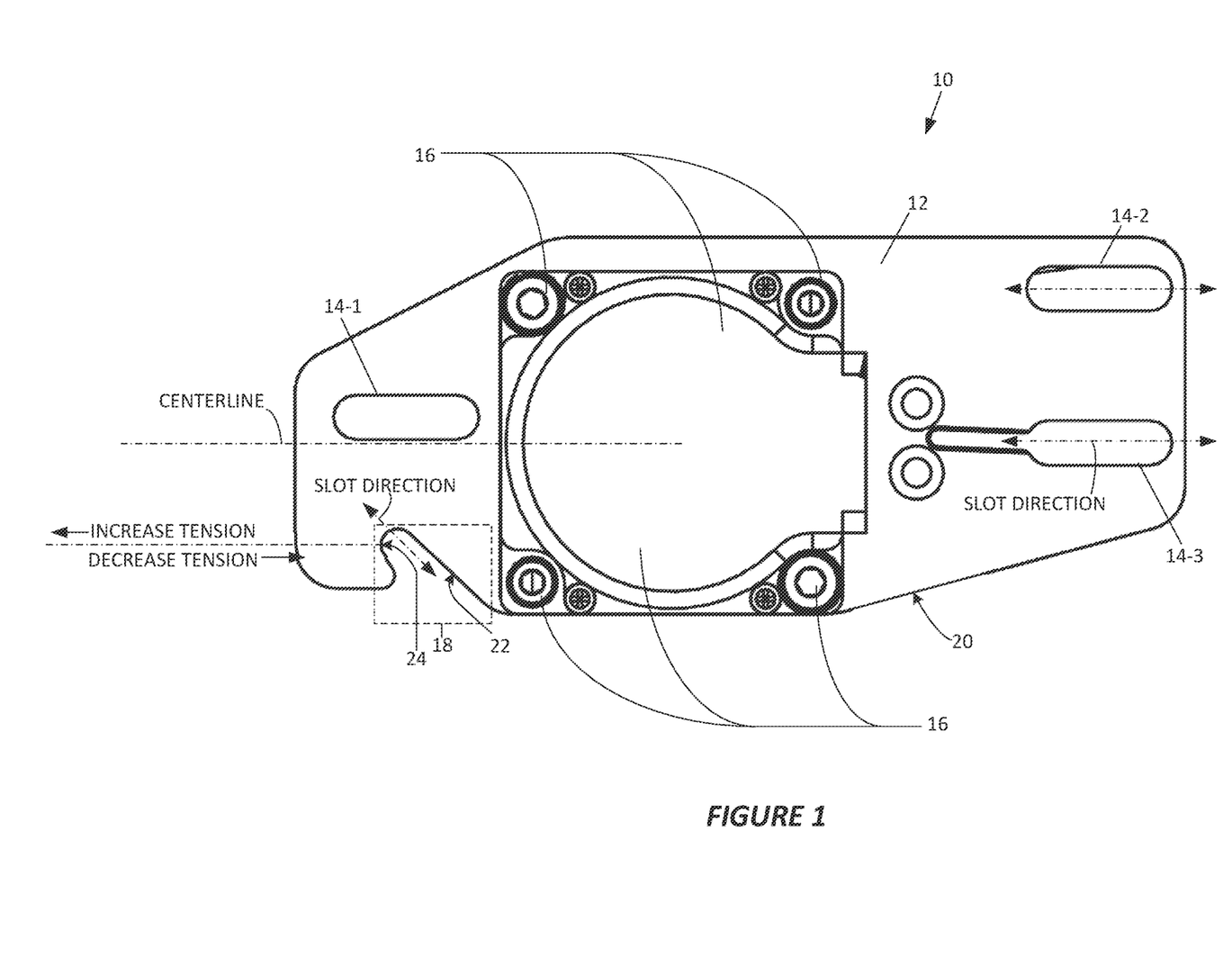
FIG. 1 is a diagram of a mounting apparatus according to one embodiment.

FIG. 1 illustrates one embodiment of a mounting apparatus 10 that includes a body member 12 having one or more attachment slots 14 for attaching the mounting apparatus 10 to a surrounding structure via attachment hardware inserted through the attachment slots 14. By way of example, the illustrated body member 12 includes three attachment slots 14-1, 14-2, and 14-3, and the diagram omits the attachment hardware and the surrounding structure/environment to provide an unobstructed view of the mounting apparatus 10.

With the mounting apparatus 10 in situ and with the attachment hardware in a loosened state, the body member 12 is linearly slidable along a directional line defined by a slot direction of the one or more attachment slots 14. Here, "in situ" means mounted or otherwise installed in the contemplated surrounding environment. To that end, the body member 12 further has one or more apertures 16 or other physical features for attaching a pulley assembly (not shown) that includes a first pulley of a drive belt, and wherein sliding the body member 12 in situ in a first direction along the directional line increases a belt tension of a drive belt mounted on the first pulley.

Advantageously, the body member 12 incorporates a dedicated physical feature 18. The dedicated physical feature 18 is configured for temporary engagement of a separate tensioning tool (not shown), for exerting a pulling force on the body member 12 in the first direction to set the belt tension.

In at least one embodiment, the body member 12 is a mounting plate. Further, in at least one embodiment, the dedicated physical feature 18 is integrally formed in the body member 12. For example, the dedicated physical feature 18 is machined into the body member 12 or stamped into the body member 12 or the body member 12 is a cast item with the dedicated physical feature 18 defined in the casting.

In at least one particular embodiment, the body member 12 is a mounting plate, and the dedicated physical feature 18 is a dedicated hook feature formed in an outside perimeter edge 20 of the mounting plate. The dedicated hook feature comprises, for example, a perimeter opening machined or otherwise formed in the outside perimeter edge 20 of the mounting plate. The perimeter opening includes an inlet taper 22 that tapers inward in the first direction—i.e., runs on a diagonal in the intended pulling/tensioning direction. Advantageously, the inlet taper 22 is configured to guide an engaging portion (not shown) of the tensioning tool into a hooked recess 24 formed within the perimeter opening.

The perimeter opening has radiused contours throughout, in one or more embodiments, with the radiused contours facilitating entry and exit of the engaging portion of the tensioning tool from the hooked recess 24.

As a further example, in an embodiment where the body member 12 is a mounting plate, the dedicated physical feature 18 comprises a slotted opening in a perimeter edge 20 of the mounting plate, and wherein a slot direction of the slotted opening is diagonal to the slot direction of the one or more attachment slots 14.

Figure 2:
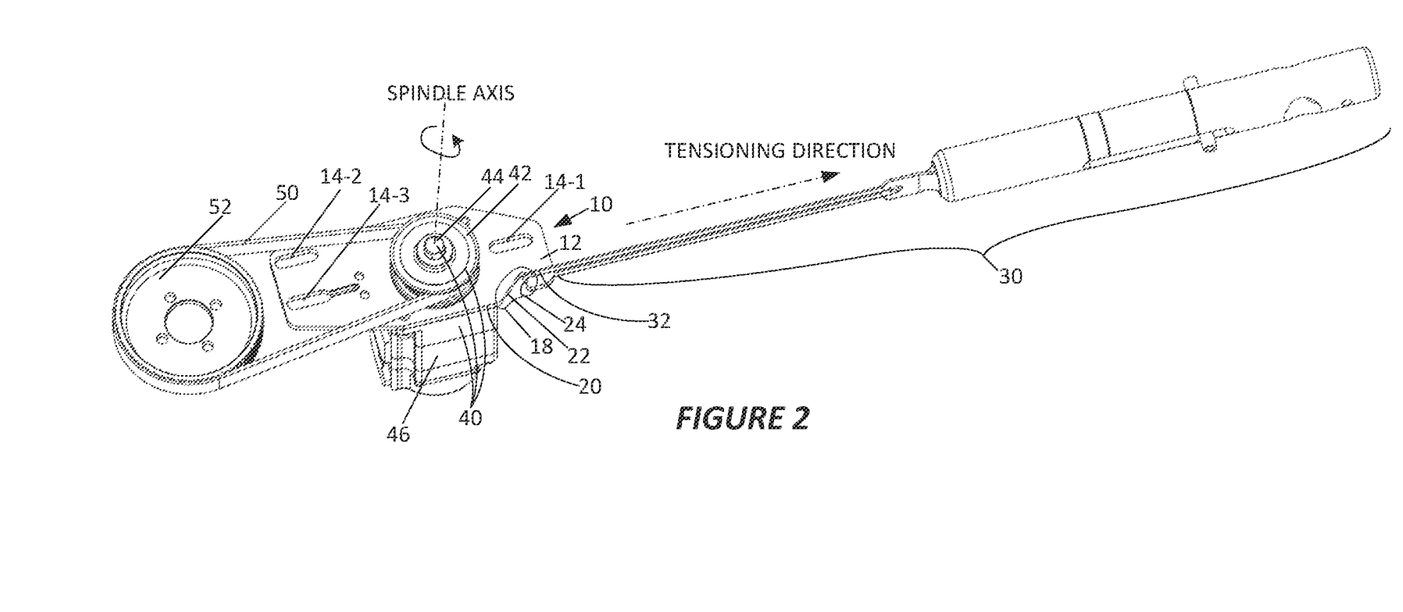
FIG. 2 is a diagram of the mounting apparatus of FIG. 1, shown in context with additional environment details.

FIG. 2 illustrates the mounting apparatus 10 introduced in FIG. 1 and provides additional environmental details. Additional details include a depiction of one example of a tensioning tool 30 that includes a metal or cord loop having a loop end that serves as an engaging portion 32 of the tensioning tool 30. The engaging portion 32 of the tensioning tool 30 engages with the dedicated physical feature 18 of the body member 12, and thus provides a mechanism for pulling the body member 12 in a tensioning direction. Specifically, where the dedicated physical feature 18 comprises an opening in the perimeter edge 20 of the body member 12, the engaging portion 32 of the tensioning tool 30 is urged or otherwise led into the hooked recess 24 by the inlet taper 22.

Further details include a depiction of an example pulley assembly 40 that includes a pulley 42 mounted on a spindle 44 that is driven by a motor 46 that attaches to the body member 12, such that the body member 12 can be understood as "carrying" the overall pulley assembly 40. In the illustrated example, the pulley 42 is the drive pulley in a two-pulley arrangement in which a drive belt 50 transfers rotational movement of the pulley 42 to a second pulley 52. In at least one embodiment, the belt 50 crosses an articulated joint of a robot, for transfer of motive force across the joint.

In this regard, the term "pulley" has broad meaning and may be any type of pulley, including those configured for V-belts, toothed belts, etc. The term "sheave" is also encompassed within the term "pulley."

Turning back to example details of the dedicated physical feature 18 in an embodiment where the dedicated physical feature 18 is a contoured opening machined or otherwise formed within a perimeter edge 20 of the body member 12. The surface of the mounting-plate edge within the hooked recess 24 of the contoured opening defines an engagement surface for the engaging portion 32 of the tensioning tool 30 and allows the body member 12 to be pulled in a tensioning direction along a tensioning axis that is centered on the hooked recess 24 and parallel to a center line/axis of the body member 12. The centerline axis of the body member 12 for example is perpendicular to and intersects with the rotational/spindle axis of the pulley 42 that is carried on/by the body member 12.

Because of the offset between the centerline axis of the body member 12 and the pulling axis, exerting a pulling force along the pulling axis produces a torque on the body member 12 around the rotational/spindle axis. While the attachment hardware used to fasten the body member 12 in situ to the surrounding structure—e.g., bolts, pins, or screws passed through the attachment slot(s) 14—prevents significant rotation of the body member 12 in a plane that is perpendicular to the rotational/spindle axis, the attachment hardware is loosened for tensioning operations and, thus, some marginal rotation of the body member 12 may occur upon application of the pulling/tensioning force.

To prevent or at least substantially reduce the marginal rotation of the mounting apparatus 10 during tensioning operations, at least one of the one or more attachment slots 14 of the body member 12 is dimensioned for a close fit regarding a designed—for diameter of the attachment hardware. As a general proposition, the attachment slots 14 are dimensioned for a given size of attachment hardware or a given range of sizes. Therefore, the "close fit" is a tighter tolerance or fit, for touching engagement with the circumferential surface of the attachment hardware, to allow for sliding movement of the body member 12 along the pulling axis/centerline axis while preventing any "play" in the body member 12 in the rotational direction around the rotational/spindle axis.

Figure 3:
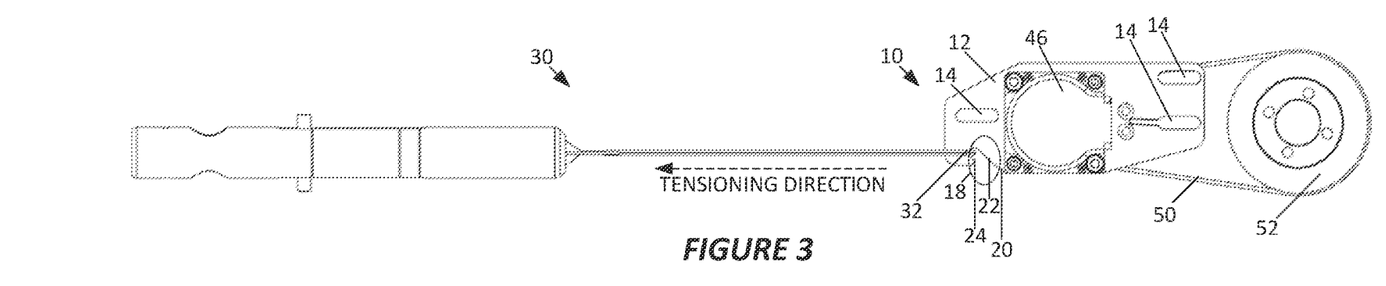
FIG. 3 corresponds to FIG. 2, but depicts a plan view of the mounting apparatus.
Figure 4:
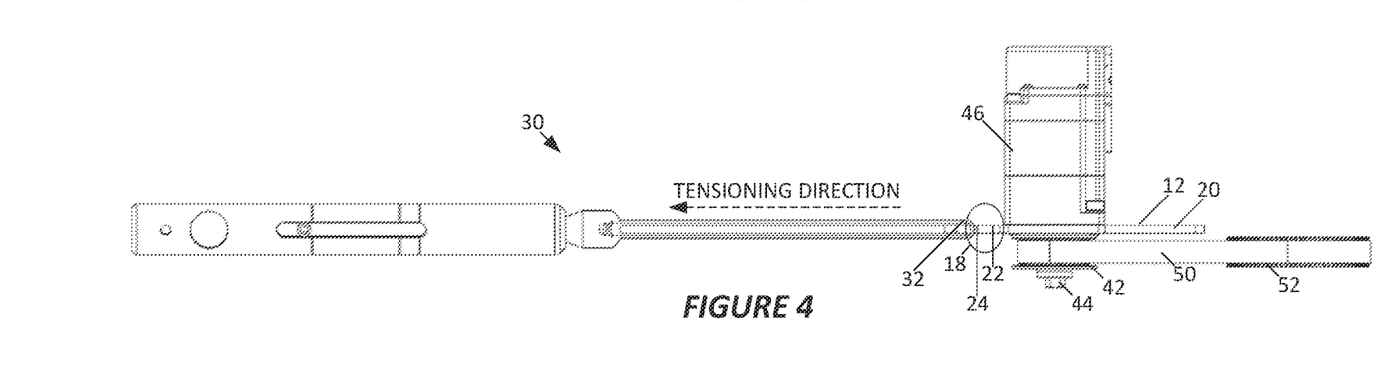
FIG. 4 corresponds to FIG. 2, but depicts a side view of the mounting apparatus.
Figure 5:
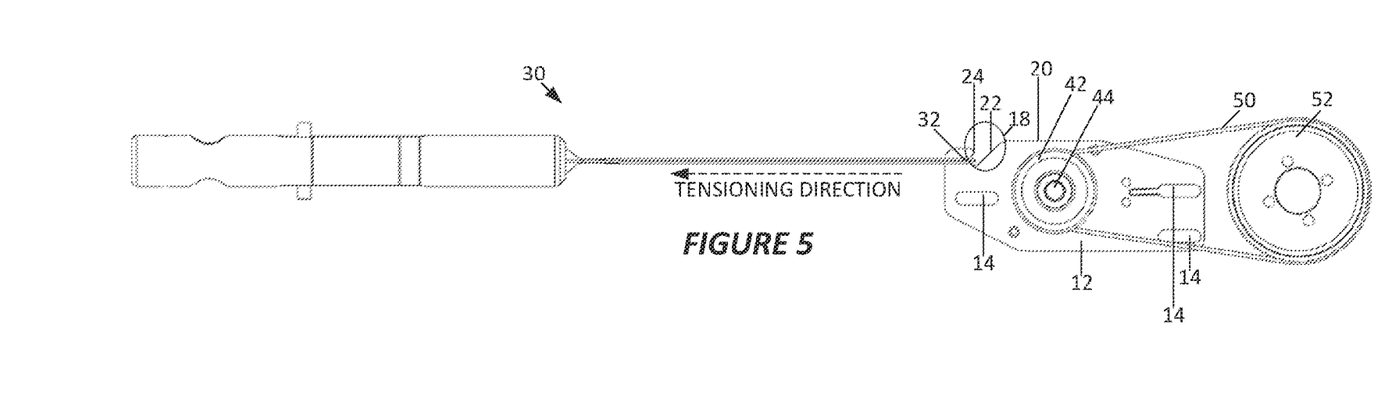
FIG. 5 corresponds to FIG. 3, but depicts an opposite plan view of the mounting apparatus.

FIG. 3 shows a plan view of the overall assembly depicted in FIG. 2. FIG. 4 illustrates the arrangement of FIG. 3 but shown from one side. FIG. 5 illustrates the arrangement of FIG. 3 but shown in the opposite plan view.

Figure 6:
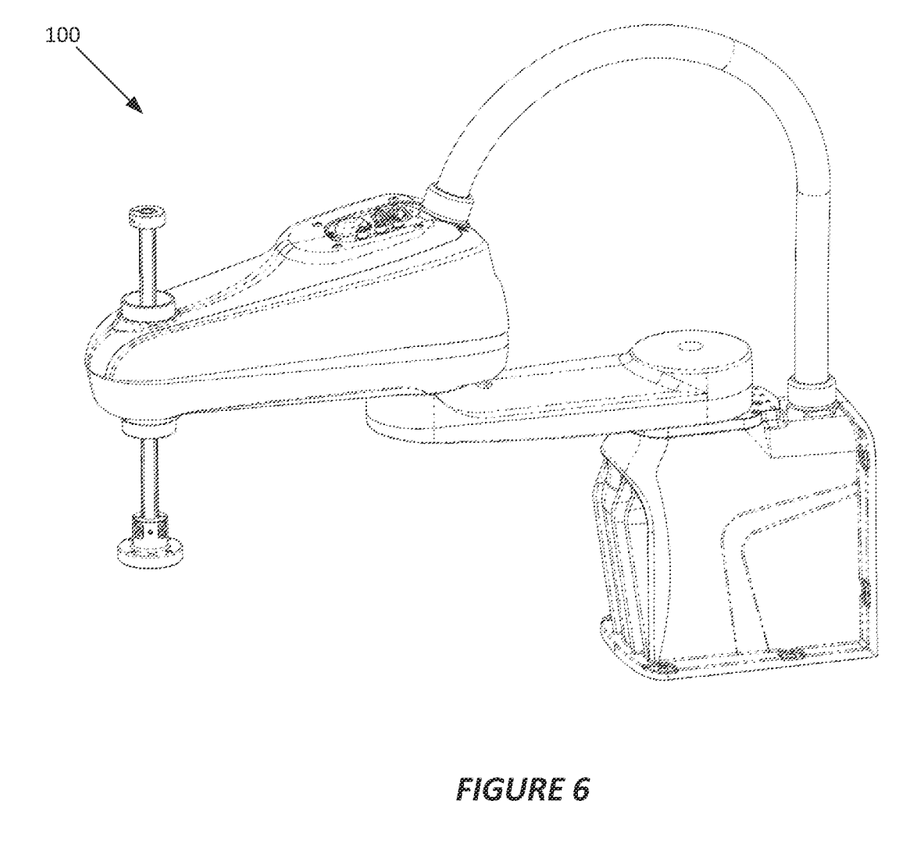
FIG. 6 illustrates a robot according to an example embodiment comprising a Selective Compliance Articulated Robot Arm (SCARA) that includes one or more instances of a mounting apparatus as disclosed herein.
Figure 7:
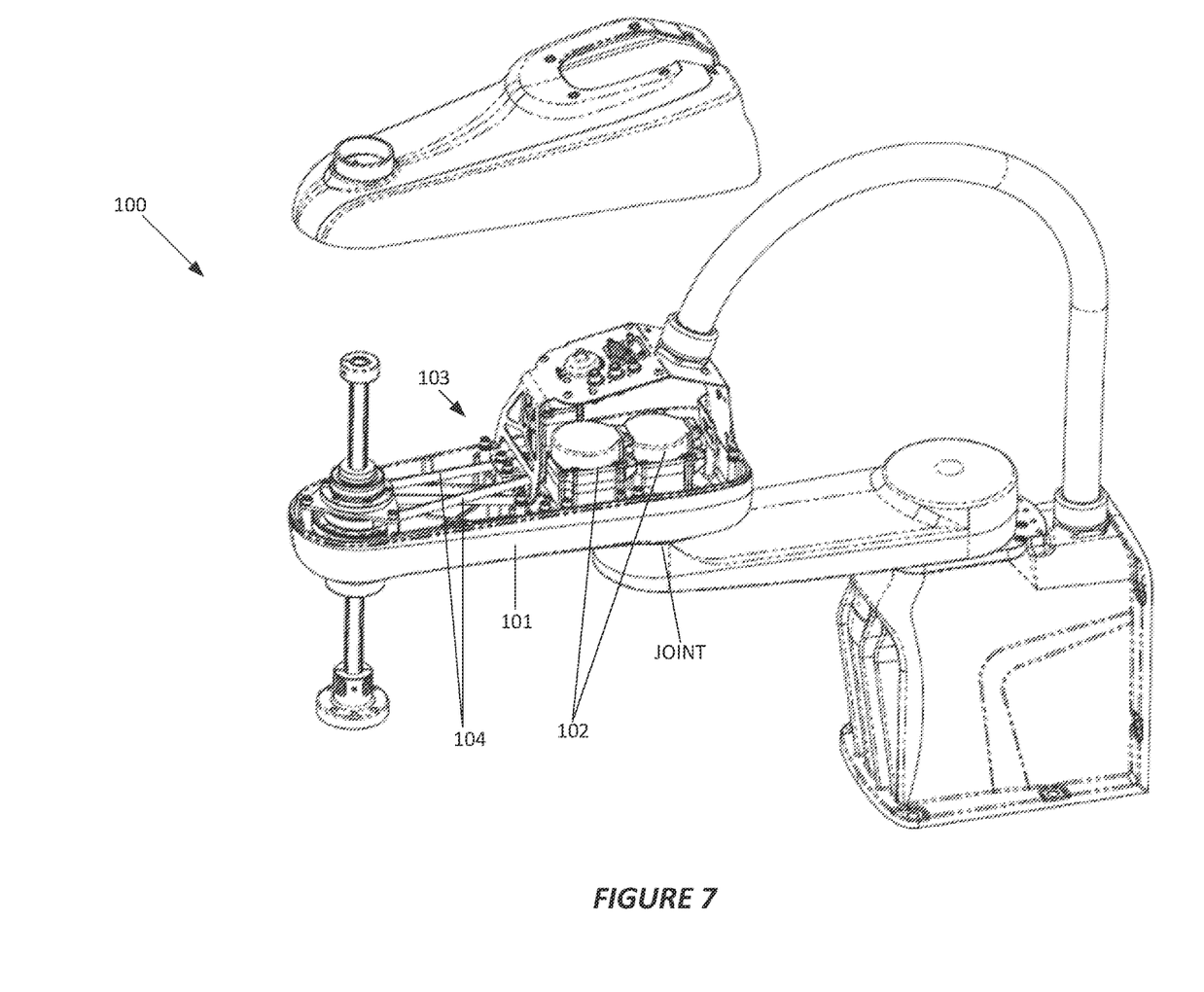
FIG. 7 illustrates another view of the robot introduced in FIG. 6, with an interior volume revealed.

FIG. 6 illustrates a robot 100 comprising a SCARA and including one or more of instances of the mounting apparatus 10, for tensioning one or more internal belt(s), e.g., used on Joints 3 and 4 of the robot 100 (on the "θ" and "z" axes of the robot). FIG. 7 illustrates the robot 100 with a portion of its external housing or casing removed, to reveal internal elements, including motor assemblies 102 and drive belts 104. These assemblies are carried at least in part within a segment 101 of the robot 100 and housed in an interior volume 103 of that segment 101, with one or more mounting assemblies 10 used to provide tensioning adjustment for one or more of the drive belts 104.

Figure 8:
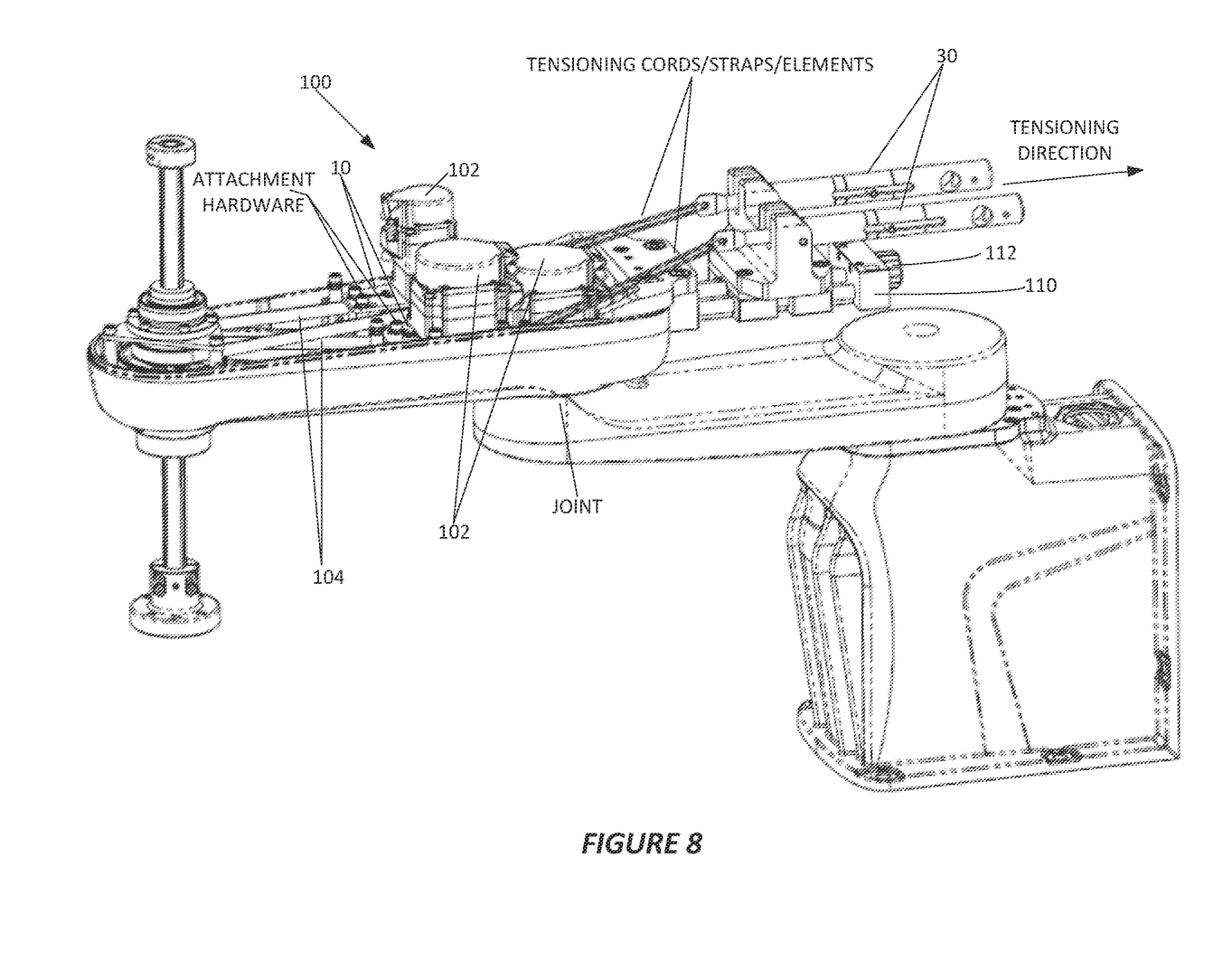
FIG. 8 illustrates yet another view of the robot introduced in FIG. 6, with further interior details.

FIG. 8 illustrates a further exposure of the robot 100 depicting respective ones of the motor assemblies 102 mounted in situ within the interior of the robot via respective instances of one embodiment of the mounting apparatus 10 described herein. In particular, attachment hardware mounts the respective mounting apparatuses 10 within an interior volume of the robot, with each mounting apparatus 10 carrying a respective motor assembly 102.

A linear tensioning jig 110 is attached to or integrated with the robot 100 and it carries one or more tensioning tools 30, with two shown in the non-limiting example arrangement. Here, it should be understood that an individual tensioning tool 30 as carried by the linear jig 110 can be used to tension multiple belts 104 within the robot 100, by operating on the respective mounting assemblies 10 one at a time. The linear jig moves in and out (linearly) in the tensioning direction. e.g., based on rotating a jackscrew via a knob 112.

Correspondingly, the tensioning tool(s) 30 carried in the linear jig 30 have a visual indicator, indicating current tension and thereby allowing an operator to set the correct tension on the belt(s) 104 being adjusted. In at least one embodiment, the tensioning tool(s) 30 are electronically readable, e.g., via a proportional analog sensor signal or a digitized signal indicating measured tension, and the linear rig 110 is machine-driven, e.g., by another robot or other tensioning machine configured to drive the linear jig 110 responsive to tensioning readings from the tensioning tool(s) 30 in the linear jig 110.

Figure 9:
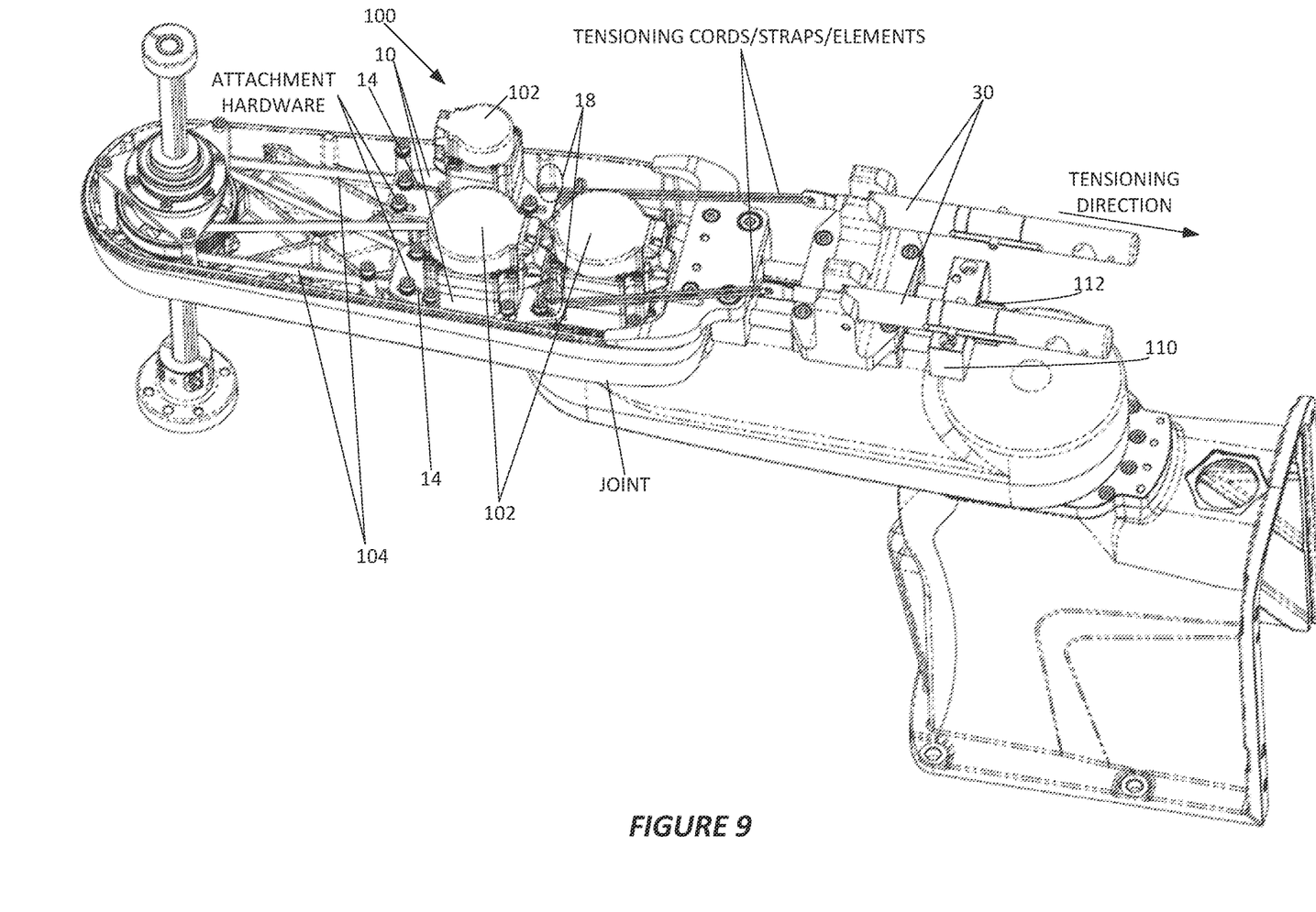
FIG. 9 further illustrates mounting-apparatus details introduced in FIG. 8.

FIG. 9 provides a different perspective view of the robot 100 as compared to FIG. 8, with better visibility of the respective mounting apparatuses 10. In particular, FIG. 9 illustrates the dedicated engagement feature 18—e.g., an integrated hook feature—included in the body members 12 of the mounting apparatuses 10. Engaging ends or loops of the tensioning cords coupled to the respective tensioning tools 30 "hook" the dedicated physical features 18 of the respective mounting apparatuses 10, providing for tensioning of the belts 104 that are associated with the motors 102 carried on the respective mounting apparatuses.

Figure 10:
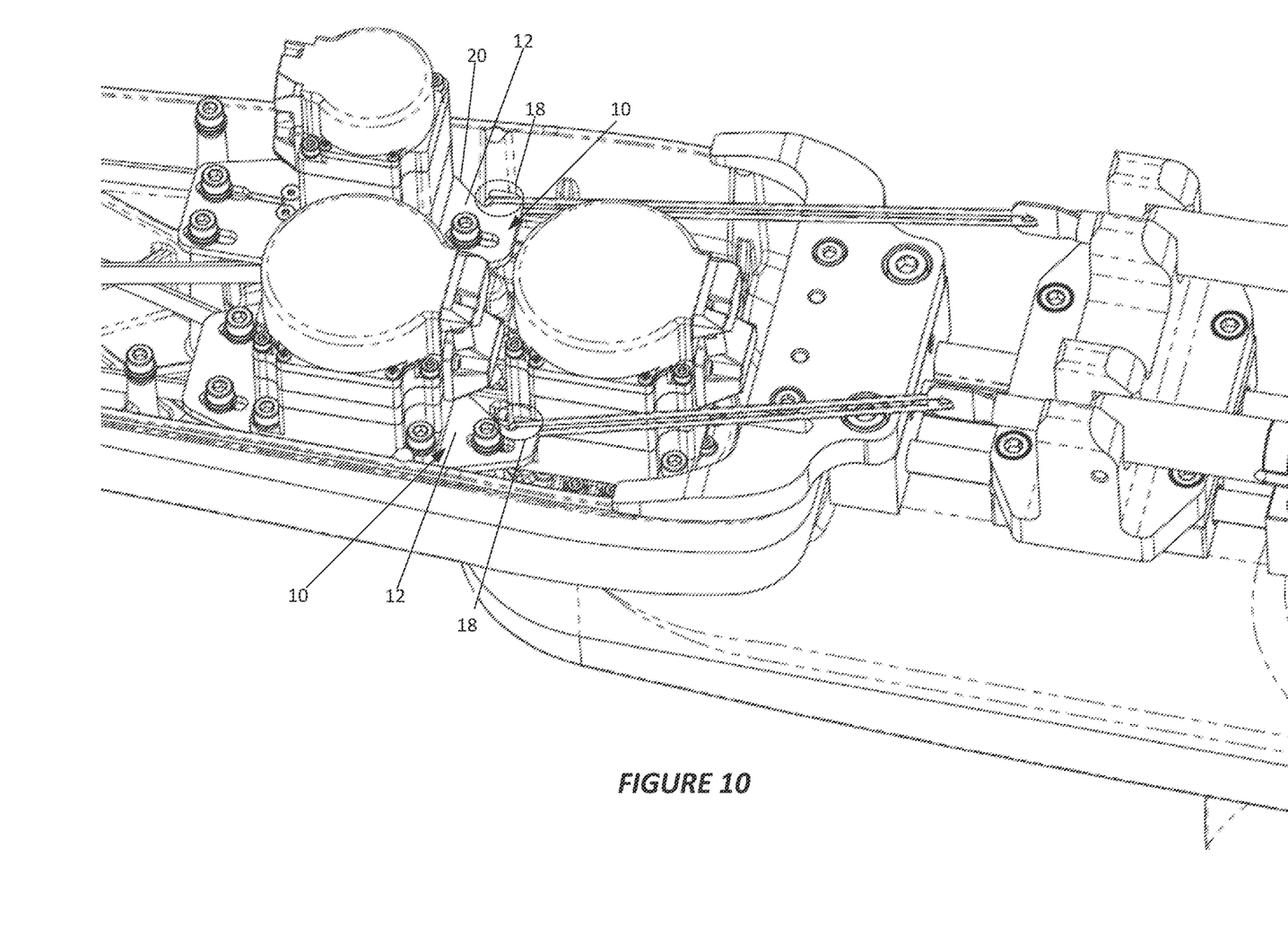
FIG. 10 illustrates a close-up view of details shown in FIG. 9.

FIG. 10 provides a zoomed view from the same perspective as FIG. 9, with focus on the mounting apparatuses 10. The body members 12 of the mounting apparatuses 10 are formed as mounting plates that attach to interior mounting points of the robot 100 and carry respective motor assemblies 102, which in turn drive corresponding belts that are tensioned by engaging with the dedicated physical features 18.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A mounting apparatus comprising:
   a body member having:
      one or more apertures for attaching a pulley assembly that includes a first pulley configured to carry a drive belt, and
      one or more attachment slots for attaching the mounting apparatus to a surrounding structure via attachment hardware inserted through the one or more attachment slots, such that, with the mounting apparatus attached and with the attachment hardware in a loosened state, the body member is linearly slidable along a directional line defined by a slot direction of the one or more attachment slots, and wherein sliding the body member in a first direction along the directional line increases a belt tension of the drive belt carried on the first pulley; and
      a dedicated physical feature incorporated in or on the body member, the dedicated physical feature being configured for temporary engagement of a separate tensioning tool, for exerting a pulling force on the body member in the first direction to set the belt tension;
   wherein the dedicated physical feature is integrally formed in the body member;
   wherein the body member is a mounting plate, and the dedicated physical feature is a dedicated hook feature formed in an outside perimeter edge of the mounting plate; and
   wherein the dedicated hook feature comprises a perimeter opening machined or otherwise formed in the outside perimeter edge of the mounting plate, the perimeter opening including an inlet taper that tapers inward in the first direction, with the inlet taper configured to guide an engaging portion of the tensioning tool into a hooked recess formed within the perimeter opening.

2. The mounting apparatus according to claim 1, wherein the perimeter opening has radiused contours throughout, to facilitate entry and exit of the engaging portion of the tensioning tool from the hooked recess.

3. The mounting apparatus according to claim 1, wherein the mounting apparatus comprises a component of a robot and mounts the pulley assembly to surrounding structure within an interior volume of the robot for in situ tensioning of the drive belt.

4. A robot comprising:
   a segment having an interior volume;
   a mounting apparatus configured for mounting a pulley assembly within the interior volume of the segment, the pulley assembly having a first pulley configured to carry a drive belt;
   the mounting apparatus comprising:
      a body member having:
         one or more apertures for attaching the pulley assembly to the body member;
         one or more attachment slots for attaching the mounting apparatus to surrounding structure of the robot within the interior volume via attachment hardware inserted through the one or more attachment slots, such that, with the mounting apparatus attached and the attachment hardware in a loosened state, the body member is linearly slidable along a directional line defined by a slot direction of the one or more attachment slots, wherein sliding the body member in a first direction along the directional line increases a belt tension of the drive belt carried on the first pulley; and
      a dedicated physical feature incorporated in or on the body member, the dedicated physical feature being configured for temporary engagement of a separate tensioning tool, for exerting a pulling force on the body member in the first direction to set the belt tension;
   wherein the dedicated physical feature is integrally formed in the body member;
   wherein the body member is a mounting plate, and the dedicated physical feature is a dedicated hook feature formed in an outside perimeter edge of the mounting plate; and
   wherein the dedicated hook feature comprises a perimeter opening machined or otherwise formed in the outside perimeter edge of the mounting plate, the perimeter opening including an inlet taper that tapers inward in the first direction, with the inlet taper configured to guide an engaging portion of the tensioning tool into a hooked recess formed within the perimeter opening.

5. The robot according to claim 4, wherein the perimeter opening has radiused contours throughout, to facilitate entry and exit of the engaging portion of the tensioning tool from the hooked recess.

6. The robot according to claim 4, wherein the segment of the robot includes a removable cover portion that exposes at least the dedicated physical feature incorporated in or on the body member, for engagement by the separate tensioning tool.

7. A mounting apparatus comprising:
a body member having:
one or more apertures for attaching a pulley assembly that includes a first pulley configured to carry a drive belt, and
one or more attachment slots for attaching the mounting apparatus to a surrounding structure via attachment hardware inserted through the one or more attachment slots, such that, with the mounting apparatus attached and with the attachment hardware in a loosened state, the body member is linearly slidable along a directional line defined by a slot direction of the one or more attachment slots, and wherein sliding the body member in a first direction along the directional line increases a belt tension of the drive belt carried on the first pulley; and
a dedicated physical feature incorporated in or on the body member, the dedicated physical feature being configured for temporary engagement of a separate tensioning tool, for exerting a pulling force on the body member in the first direction to set the belt tension;
wherein the body member is a mounting plate and wherein the dedicated physical feature comprises a slotted opening in a perimeter edge of the mounting plate, and wherein a slot direction of the slotted opening is diagonal to the slot direction of the one or more attachment slots.

8. A robot comprising:
a segment having an interior volume;
a mounting apparatus configured for mounting a pulley assembly within the interior volume of the segment, the pulley assembly having a first pulley configured to carry a drive belt;
the mounting apparatus comprising:
a body member having:
one or more apertures for attaching the pulley assembly to the body member;
one or more attachment slots for attaching the mounting apparatus to surrounding structure of the robot within the interior volume via attachment hardware inserted through the one or more attachment slots, such that, with the mounting apparatus attached and the attachment hardware in a loosened state, the body member is linearly slidable along a directional line defined by a slot direction of the one or more attachment slots, wherein sliding the body member in a first direction along the directional line increases a belt tension of the drive belt carried on the first pulley; and
a dedicated physical feature incorporated in or on the body member, the dedicated physical feature being configured for temporary engagement of a separate tensioning tool, for exerting a pulling force on the body member in the first direction to set the belt tension;
wherein the body member is a mounting plate and wherein the dedicated physical feature comprises a slotted opening in a perimeter edge of the mounting plate, and wherein a slot direction of the slotted opening is diagonal to the slot direction of the one or more attachment slots.

* * * * *